J. Brown.
Hats & Caps.
Nº 4246.    Patented Oct. 31, 1845.
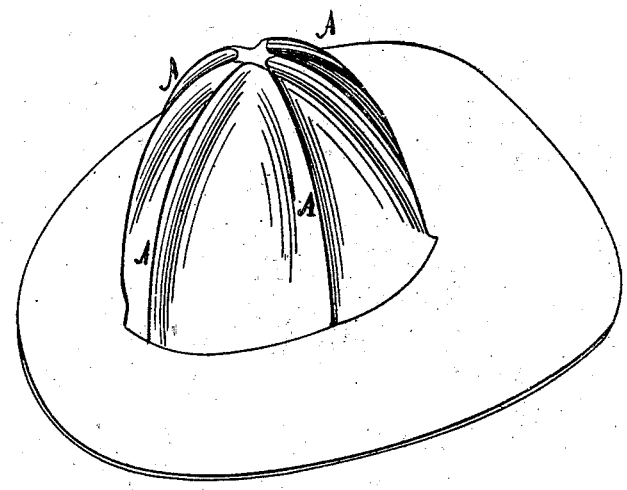

UNITED STATES PATENT OFFICE.

JAMES BROWN, OF NEWARK, NEW JERSEY.

FIREMAN'S HAT.

Specification of Letters Patent No. 4,246, dated November 1, 1845.

*To all whom it may concern:*

Be it known that I, JAMES BROWN, of the city of Newark, in the county of Essex and State of New Jersey, have invented a new and useful Manufacture of Firemen's or Watchmen's Hats; and I do hereby declare that the following is a full and exact description thereof.

Hats for firemen and watchmen have been heretofore made of leather, and have been strengthened in the crown by the forming of welts or ribs thereon, as a safeguard from injury by a blow or by falling bodies. Such hats, are, however so costly as to prevent their general use, and are so weighty as to be not only burdensome but to produce great distress and pain in the head if worn for a few hours only.

My improved hat can be afforded at about one third of the cost of those made of leather, and not exceeding one half their weight, while they possess all the useful properties of those made of leather.

I make the body of my improved hats of wool, and by means of proper molds or blocks I form upon their crowns any desired number of welts or ribs; these welts or ribs I fill on the inside with some hard substance which will cause them to preserve their form and to resist the effects of a blow upon them. I have for this purpose essayed strips of metal, of white oak, and of hickory; but upon the whole I give the preference to a cement which will become hard by cooling or by drying and which will at the same time, be tough and unyielding. This cement may be of the resinous kind combined with wool, tow or other fibrous material; or with drying oil or varnish which being subjected to the heat necessary for drying the japan with which the hats are to be coated, will become sufficiently hard for the intended purpose.

The accompanying drawing represents one of my hats, A, A, being the welts, or ribs on its crown. There may be a shield of leather or of other material in front to receive any device or label as in those made of leather. The hats are to be well coated with suitable Japan varnish, in the ordinary way.

Having thus fully described the nature of my improved hat which is principally intended for the use of watchmen and firemen, I do hereby declare that I do not claim to have invented anything new in the manner of forming such hats; but

What I do claim as new and desire to secure by Letters Patent is—

The manner herein described of forming or combining of welts or ribs with hats having bodies of wool as represented at A, A, in the accompanying drawing; such ribs being strengthened by filling the inside of the same with any suitable material in the manner set forth by which combination, I form a hat as hereinbefore stated of a material not hitherto considered as applicable thereto and possessing the desirable properties of lightness and of being brought into market at a cost far below those that have been heretofore made.

JAMES BROWN.

Witnesses:
DAVID W. BALDWIN,
THEO. F. MARTIN.